(12) United States Patent
Schimel

(10) Patent No.: US 10,199,843 B2
(45) Date of Patent: Feb. 5, 2019

(54) CONNECT/DISCONNECT MODULE FOR USE WITH A BATTERY PACK

(71) Applicant: Infineon Technologies Americas Corp., El Segundo, CA (US)

(72) Inventor: Paul L. Schimel, Algonquin, IL (US)

(73) Assignee: INFINEON TECHNOLOGIES AMERICAS CORP., El Segundo, CA (US)

( * ) Notice: Subject to any disclaimer, the term of this patent is extended or adjusted under 35 U.S.C. 154(b) by 90 days.

(21) Appl. No.: 15/015,038

(22) Filed: Feb. 3, 2016

(65) Prior Publication Data

US 2016/0352106 A1    Dec. 1, 2016

Related U.S. Application Data

(60) Provisional application No. 62/166,607, filed on May 26, 2015.

(51) Int. Cl.
*H02J 7/00* (2006.01)

(52) U.S. Cl.
CPC .......... *H02J 7/0031* (2013.01); *H02J 7/0013* (2013.01); *H02J 7/0073* (2013.01)

(58) Field of Classification Search
CPC ....................................................... H02J 7/007
USPC ................................................. 320/112, 134
See application file for complete search history.

(56) References Cited

U.S. PATENT DOCUMENTS

| 6,023,110 | A | 2/2000 | Henrion | |
|---|---|---|---|---|
| 7,242,196 | B2 | 7/2007 | Yudahira | |
| 8,901,934 | B2 | 12/2014 | Namou | |
| 2004/0165329 | A1 | 8/2004 | Andrews | |
| 2011/0133701 | A1* | 6/2011 | Li | H02J 7/0091 320/153 |
| 2011/0181246 | A1* | 7/2011 | Tae | H02J 7/0014 320/118 |

FOREIGN PATENT DOCUMENTS

| CN | 102201734 A | 9/2011 |
|---|---|---|
| CN | 102318176 A | 1/2012 |
| CN | 102403757 A | 4/2012 |
| CN | 102754346 A | 10/2012 |
| CN | 103683370 A | 3/2014 |

* cited by examiner

*Primary Examiner* — Edward Tso
*Assistant Examiner* — Ahmed Omar
(74) *Attorney, Agent, or Firm* — Slater Matsil, LLP

(57) ABSTRACT

There are disclosed herein various implementations of a connect/disconnect module for use with a battery pack. The connect/disconnect module includes a charge/discharge current path including multiple transistors having a first safe operating area (SOA), and a pre-charge current path coupled across the charge/discharge current path. The pre-charge current path includes multiple transistors having a second SOA that is significantly greater than the first SOA.

27 Claims, 4 Drawing Sheets

CONNECT/DISCONNECT MODULE FOR USE WITH A BATTERY PACK

BACKGROUND

The present application claims the benefit of and priority to a provisional application titled "Solid State Apparatus and Method for Disconnecting and Reconnecting Sensitive Battery Chemistries," Ser. No. 62/166,607 filed on May 26, 2015. The disclosure in this provisional application is hereby incorporated fully by reference into the present application.

BACKGROUND ART

Rugged battery packs capable of delivering high current outputs are used in a wide variety of applications. For example, automobiles, military vehicles, and manned and unmanned aircraft may utilize arrays of secondary batteries that are alternately charged and discharged during their operating lifetimes. Moreoever, the secondary battery packs may include lithium ion or other high power density battery chemistries that are intolerant to overcharge and overdischarge events. As a result, there is a need in the art for a solution enabling fast, reliable, and safe connection and disconnection of a battery pack from its load or charging source, even under high current operating conditions.

SUMMARY

The present disclosure is directed to a connect/disconnect module for use with a battery pack, substantially as shown in and/or described in connection with at least one of the figures, and as set forth in the claims.

DETAILED DESCRIPTION

Figure 1:
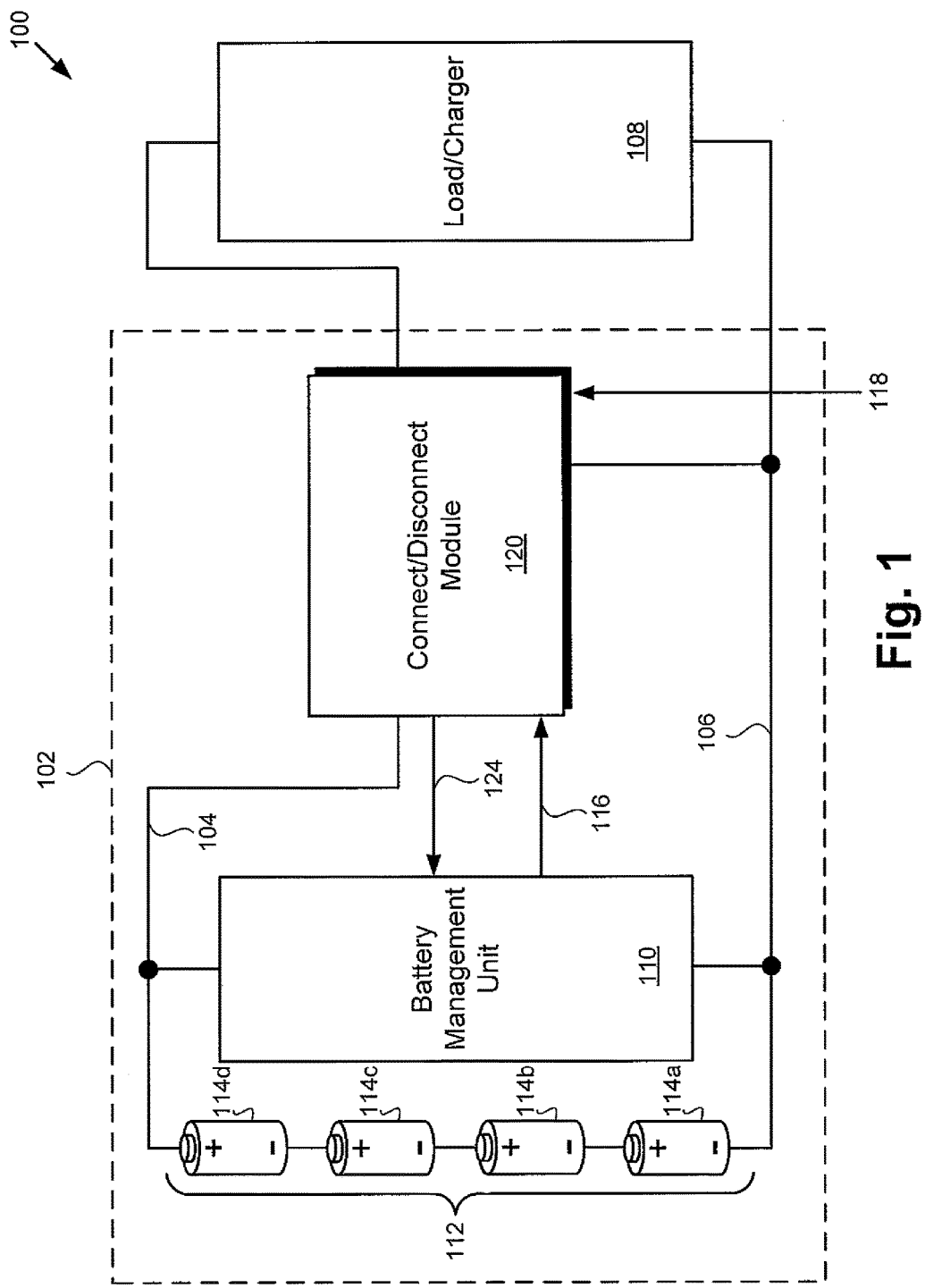
FIG. 1 shows a diagram of a power system including a battery pack and a connect/disconnect module, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of power system 102 including a battery pack and a connect/disconnect module, according to one implementation. As shown in FIG. 1, power system 102 is situated in operating environment 100 and is coupled to load and/or charging source 108. As further shown in FIG. 1, power system 102 includes battery pack 112 including multiple battery cells 114a, 114b, 114c, and 114d (hereinafter "battery cells 114a-114d"), battery management unit 110, and connect/disconnect module 120. Also shown in FIG. 1 are high voltage output bus 104 and return bus 106 of power system 102, communication signals 116 and 124 internal to power system 102, and control signal 118 received by connect/disconnect module 120 from a control source external to power system 102.

Battery pack 112 may be implemented using nominally identical secondary battery cells 114a-114d. For example, each of battery cells 114a-114d may be implemented as rechargeable (i.e., secondary) lithium ion battery cells, or as other high power density battery chemistry cell types. Although battery pack 112 is shown to include four battery cells 114a-114d, in FIG. 1, that representation is merely exemplary. More generally, battery pack 112 is any multi-cell battery pack and may include fewer battery cells, more battery cells, or many more battery cells than the four battery cells shown as battery cells 114a-114d.

Battery pack 112 may be adapted for use in a wide variety of applications, including civilian or military vehicles, manned and unmanned aircraft, and aerospace vehicles, to name a few. As a result, in some implementations, battery pack 112 may be a relatively low voltage battery pack, such as a twenty-eight volt (28V) battery pack, for example. However, in other implementations, for instance in commercial or military aviation, battery pack 112 may be a high voltage battery pack, such as a 270V battery pack.

Battery management unit 110 is coupled to battery pack 112 and is designed to equalize discharging of battery cells 114a-114d by load 108, as well as equalize charging of battery cells 114a-114d by charging source 108. Connect/disconnect module 120 is coupled between battery pack 112 and load and/or charging source 108 of battery pack 112. It is noted that, in some implementations, power system 102 may be a modular power system in which battery management unit 110 and/or connect/disconnect module 120 is integrated with battery pack 112 to provide a safe, stand-alone battery solution.

Connect/disconnect module 120 is configured to enable charging and/or discharging of battery pack 112 by battery management unit 110, as well as to protect battery pack 112 from an overcharge or overdischarge event. For example, connect/disconnect module 120 can connect battery pack 112 to load and/or charging source 108 in response to internal communication signal 116 from battery management unit 110, or in response to external control signal 118, to enable charging or discharging of battery pack 112 under the control of power management unit 110. In addition, and as described in greater detail below by reference to FIGS. 2 and 3, connect/disconnect module 120 is further configured to detect one or more fault conditions within power system 102, and to automatically disconnect battery pack 112 from load and/or charging source 108 when such a fault is detected.

Figure 2:
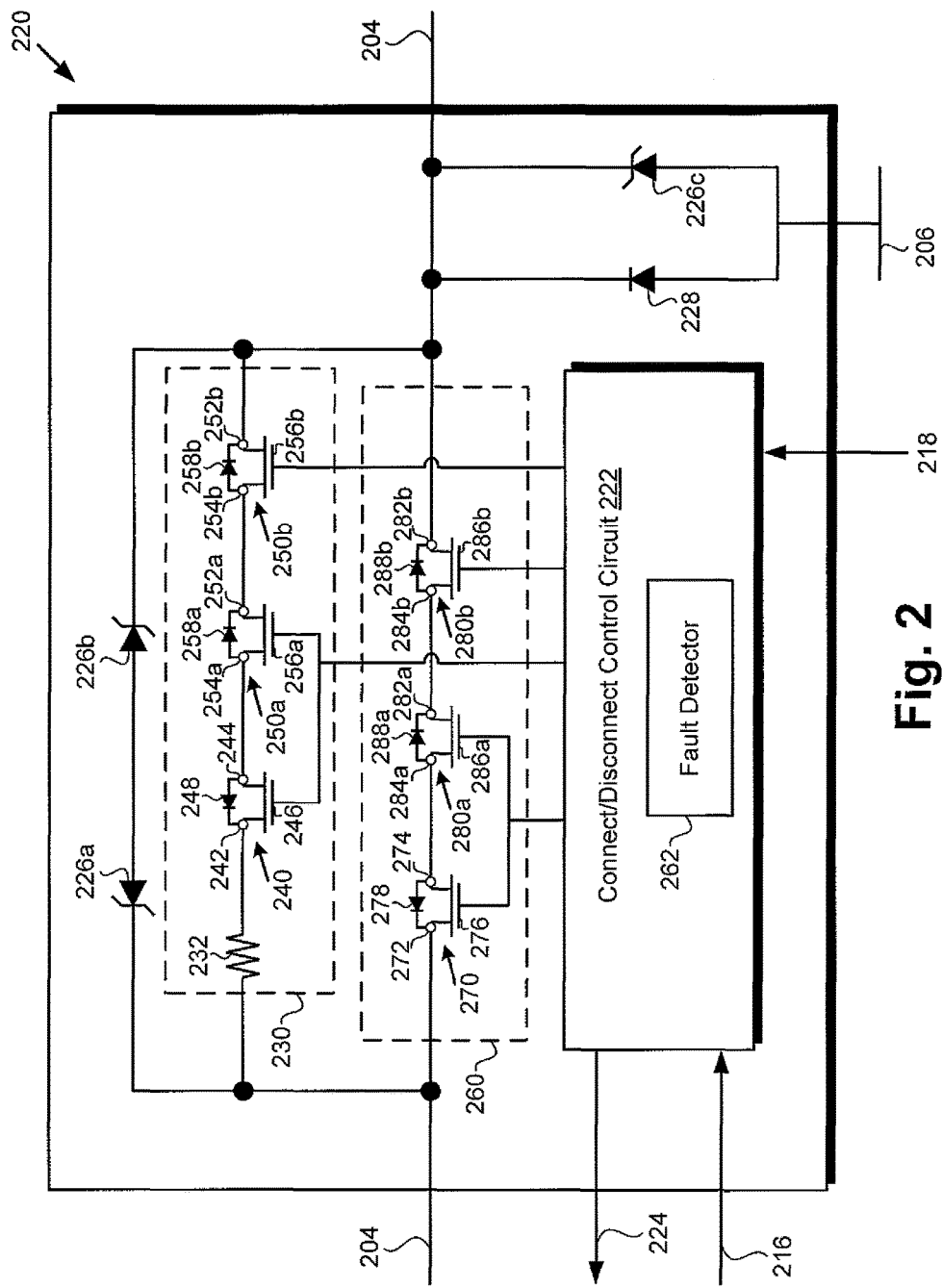
FIG. 2 shows a more detailed diagram of an exemplary connect/disconnect module suitable for use with a battery pack, according to one implementation.

Referring to FIG. 2, FIG. 2 shows a more detailed diagram of exemplary connect/disconnect module 220 suitable for use with a battery pack, according to one implementation. As shown in FIG. 2, connect/disconnect module 220 is coupled to high voltage bus 204 and low voltage bus 206, is configured to receive communication signal 216 and control signal 218, and is further configured to generate communication signal 224.

Connect/disconnect module 220 corresponds in general to connect/disconnect module 120, in FIG. 1, and may share any of the characteristics attributed to that corresponding feature in the present application. In addition, high voltage output bus 204 and return bus 206, communication signals 216 and 224, and control signal 218, in FIG. 2, correspond respectively in general to high voltage output bus 104 and return bus 106, communication signals 116 and 124 internal to power system 102, and external control signal 118, in FIG. 1, and may share any of the characteristics attributed to those corresponding features in the present application.

Connect/disconnect module 220 includes charge/discharge current path 260 having transistors 270, 280*a*, and 280*b*. Connect/disconnect module 220 also includes pre-charge current path 230 coupled across charge/discharge current path 260. As shown in FIG. 2, pre-charge current path 230 includes transistors 240, 250*a*, and 250*b* in series with resistor 232. In addition, connect/disconnect module 220 includes connect/disconnect control circuit 222 configured to selectably enable and disable charge/discharge current path 260 and pre-charge current path 230. Also shown in FIG. 2, are fault detector 262 of connect/disconnect control circuit 222, free-wheeling diode 228 coupled to low voltage bus 206, and transient voltage suppression diodes or "transorbs" 226*a*, 226*b*, and 226*c*.

According to the exemplary implementation shown in FIG. 2, charge/discharge current path 260 is implemented utilizing transistors 270, 280*a*, and 280*b* in the form of silicon based or other group IV trench field-effect transistors (trench FETs), such as silicon trench metal-oxide-semiconductor FETs (trench MOSFETs), for example. Thus, transistor 270 is shown to have drain 272, source 274, and gate 276, and to include body diode 278, while transistors 280*a* and 280*b* are shown to have respective drains 282*a* and 282*b*, sources 284*a* and 284*b*, and gates 286*a* and 286*b*, and to include respective body diodes 288*a* and 288*b*.

As shown in FIG. 2, gate 276 of transistor 270 is coupled to gate 286*a* of transistor 280*a*, and source 274 of transistor 270 is coupled to source 284*a* of transistor 280*a*, while respective body diodes 278 and 288*a* of transistors 270 and 280*a* have opposite orientations. That is to say, according to the exemplary implementation shown in FIG. 2, transistor 270 is configured to block overdischarge of battery pack 112 by, in FIG. 1, while transistor 280*a* is configured to block overcharge of battery pack 112.

As further shown in FIG. 2, transistor 280*b* has source 284*b* coupled to drain 284*a* of transistor 280*a*, and has body diode 288*b* aligned with body diode 288*a* of transistor 280*a*. Thus, like transistor 280*a*, transistor 280*b* is configured to block overcharge of battery pack 112. However, gate 286*b* of transistor 280*b* is controlled independently of gate 286*a* of transistor 280*a* by connect/disconnect control circuit 222. As a result, transistor 280*b* is a redundant transistor for blocking overcharge of battery pack 112 and provides a failsafe against overcharge of battery pack 112 in the event of a short or failure of transistor 280*a*.

It is noted that although each of transistors 270, 280*a*, and 280*b* is depicted as a single transistor, that representation is provided merely in the interests of conceptual clarity. More generally, each of transistors 270, 280*a*, and 280*b* can represent a bank of multiple transistors of substantially the same type connected in parallel. Thus transistors 270, 280*a*, and 280*b* may correspond to respective banks of parallel transistors, banks 270, 280*a*, and 280*b* being coupled in series with one another to provide charge/discharge current path 260.

In contrast to exemplary trench FETs 270, 280*a*, and 280*b* used to implement charge/discharge current path 260, pre-charge current path 230 may be implemented utilizing transistors 240, 250*a*, and 250*b* in the form of silicon based or other group IV planar FETs, such as silicon planar MOSFETs. Thus, transistor 240 is shown to have drain 242, source 244, and gate 246, and to include body diode 248, while transistors 250*a* and 250*b* are shown to have respective drains 252*a* and 252*b*, sources 254*a* and 254*b*, and gates 256*a* and 256*b*, and to include respective body diodes 258*a* and 258*b*.

As shown in FIG. 2, gate 246 of transistor 240 is coupled to gate 256*a* of transistor 250*a*, and source 244 of transistor 240 is coupled to source 254*a* of transistor 250*a*, while respective body diodes 248 and 258*a* of transistors 240 and 250*a* have opposite orientations. That is to say, according to the exemplary implementation shown in FIG. 2, transistor 240 is configured to block current flow through pre-charge current path 230 in the direction of load 108, in FIG. 1, while transistor 250*a* is configured to block current flow through pre-charge current path 230 in the direction of battery pack 112.

As further shown in FIG. 2, transistor 250*b* has source 254*b* coupled to drain 254*a* of transistor 250*a*, and has body diode 258*b* aligned with body diode 258*a* of transistor 250*a*. Thus, like transistor 250*a*, transistor 250*b* is configured to block current flow through pre-charge current path 230 in the direction of battery pack 112. However, gate 256*b* of transistor 250*b* is controlled independently of gate 256*a* of transistor 250*a* by connect/disconnect control circuit 222. As a result, transistor 250*b* is a redundant transistor for blocking current flow through pre-charge current path 230 in the direction of battery pack 112 and provides a failsafe in the event of a short or failure of transistor 250*a*.

It is noted that although each of transistors 240, 250*a*, and 250*b* is depicted as a single transistor, that representation is provided merely in the interests of conceptual clarity. More generally, each of transistors 240, 250*a*, and 250*b* can represent a bank of multiple transistors of substantially the same type connected in parallel. Thus transistors 240, 250*a*, and 250*b* may correspond to respective banks of parallel transistors, banks 240, 250*a*, and 250*b* being coupled in series with resistor 232 to provide pre-charge current path 230.

As noted above, in the exemplary implementation shown in FIG. 2, transistors 240, 250*a*, and 250*b* utilized to implement pre-charge current path 230 may take the form of planar FETs, while transistors 270, 280*a*, and 280*b* utilized to implement charge/discharge current path 260 may take the form of trench FETs. More generally, however, transistors 240, 250*a*, and 250*b* utilized to implement pre-charge current path 230 can be distinguished from transistors 270, 280*a*, and 280*b* utilized to implement charge/discharge current path 260 based on their respective safe operating areas.

As used herein, "safe operating area" (hereinafter "SOA") is defined as the voltage and current conditions over which a transistor can operate without being damaged. For example, the SOA of a particular FET may be shown on a graph having the drain-to-source voltage of the FET on the horizontal or "x-axis", and the drain-to-source current of the FET on the vertical or "y-axis." The area under a curve on the graph representative of the tolerances of the FET is termed the SOA of the FET, and combines several operating limitations of the particular device, including maximum voltage, current, power, and junction temperature. Thus, a transistor having a greater SOA than another transistor can be interpreted as being more rugged and capable of operating under higher combined voltage and current conditions without suffering damage.

Referring to connect/disconnect module 220, transistors 270, 280a, and 280b utilized to implement charge/discharge current path 260 can be characterized as having substantially the same SOA (hereinafter "first SOA"), while transistors 240, 250a, and 250b utilized to implement pre-charge current path 230 can be characterized as each having substantially another SOA (hereinafter "second SOA"). According to the implementations disclosed in the present application, the second SOA characteristic of transistors 240, 250a, and 250b is significantly greater than the first SOA characteristic of transistors 270, 280a, and 280b. Thus, transistors 240, 250a, and 250b are significantly more robust under combined higher current and higher voltage conditions than are transistors 270, 280a, and 280b.

In addition, or alternatively, in some implementations it may be advantageous or desirable to distinguish transistors 270, 280a, and 280b, from transistors 240, 250a, and 250b based on their switching speed. For example, according to the implementation shown in FIG. 2, transistors 270, 280a, and 280b may switch at a speed in a range from approximately five hundred nanosecond (500 ns) to approximately one microsecond (1.0 µs). By contrast, transistors 240, 250a, and 250b may switch at a speed in a range from approximately two to approximately ten milliseconds (2 ms-10 ms). Thus, transistors 270, 280a, and 280b utilized in charge/discharge current path 260 can have a switching speed that is one thousand times, or more, faster than the switching speed of transistors 240, 250a, and 250b utilized in pre-charge current path 230.

It is noted that the exemplary implementation shown in FIG. 2 may be well suited to applications in which battery pack 112 is a less than approximately 50V battery pack, such as a 28V battery pack. However, for application in which battery pack 112 provides more than 50V, the particular transistors utilized to implement one or both of charge/discharge current path 260 and pre-charge current path 230 may vary from the examples shown and described above by reference to FIG. 2.

For example, when battery pack 112 is a greater than 50V battery pack, transistors 270, 280a, and 280b in charge/discharge current path 260 may be implemented as silicon based or other group IV superjunction FETs. Alternatively, for such higher voltage applications, transistors 270, 280a, and 280b in charge/discharge current path 260 may be implemented as group III-V semiconductor based FETs, such as group III-V high electron mobility transistors (HEMTs).

It is noted that, as used herein, the phrase "group III-V" refers to a compound semiconductor including at least one group III element and at least one group V element. By way of example, a group III-V semiconductor may take the form of a III-Nitride semiconductor that includes nitrogen and at least one group III element. For instance, a III-Nitride FET may be fabricated using gallium nitride (GaN), in which the group III element or elements include some or a substantial amount of gallium, but may also include other group III elements in addition to gallium. Thus, in some implementations, transistors 270, 280a, and 280b of charge/discharge current path 260 may take the form of III-Nitride HEMTs.

With respect to transistors 240, 250a, and 250b in pre-charge current path 230, when battery pack 112 is a greater than 50V battery pack, transistors 240, 250a, and 250b may be implemented as silicon based or other group IV insulated-gate bipolar transistors (IGBTs). For example, transistors 240, 250a, and 250b may take the form of silicon punch-through IGBTs when battery pack 112 is configured for higher voltage applications.

Figure 3:
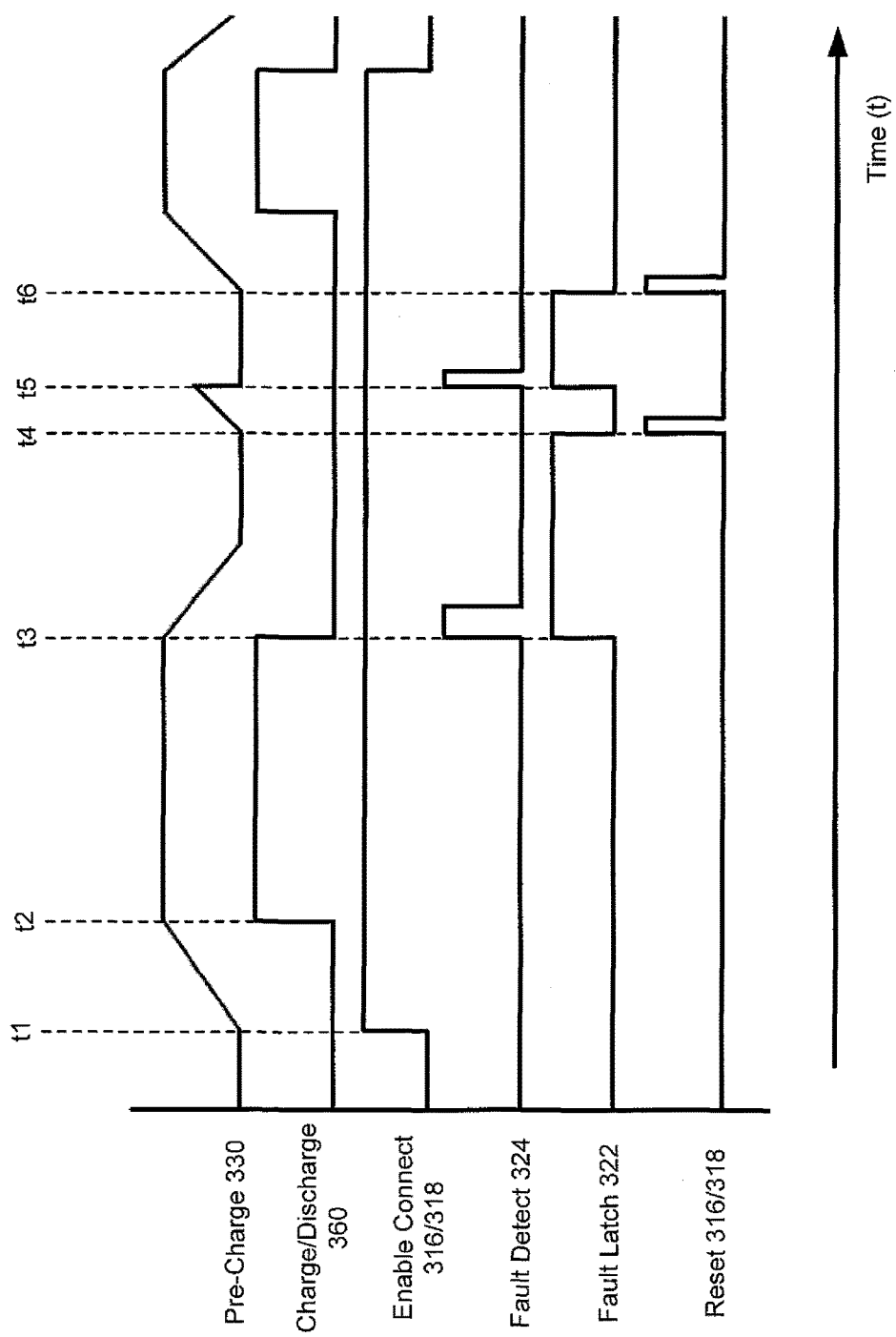
FIG. 3 shows signal waveforms corresponding to operation of a connect/disconnect module, according to one implementation.

Moving to FIG. 3, FIG. 3 shows signal waveforms corresponding to operation of a connect/disconnect module 120/220, according to one implementation. FIG. 3 shows signals corresponding respectively to pre-charge current 330, charge/discharge current 360, enable connect signal 316/318, fault detect signal 324, fault latch signal 322, and reset signal 316/318. Pre-charge current 330 and charge/discharge current 360 correspond respectively to current flowing through pre-charge current path 230 and current flowing through charge/discharge current path 260, in FIG. 2. Enable connect signal 316/318 is a command signal for connecting battery pack 112 to load and/or charging source 108 by connect/disconnect module 120/220, and may correspond to signal 116/216 received from battery management unit 110, or to control signal 118/218 received from a control source external to power system 102.

Fault detect signal 324 corresponds to signal 124/224 transmitted from connect/disconnect module 120/220 to battery management unit 110, while fault latch signal 322 corresponds to latching of connect/disconnect module 120/220 in a persistent disconnect state by connect/disconnect control circuit 222. Reset signal 316/318 is a command signal for unlatching the fault state and reconnecting battery pack 112 to load and/or charging source 108 by connect/disconnect module 120/220, and may correspond to signal 116/216 received from battery management unit 110, or to control signal 118/218 received from a control source external to power system 102.

As shown by FIG. 3, at time t1 connect/disconnect module 120/220 receives enable connect signal 316/318 and enables pre-charge current 330 to begin flowing through pre-charge current path 230. During the interval between time t1 and time t2, pre-charge current 330 increases through pre-charge current path 230 as connect/disconnect control circuit 222 utilizes fault detector 262 to determine whether a fault condition, such as a short circuit condition for example, is present. If no fault condition is detected, charge/discharge current path 260 is enabled, and charge/discharge current 360 flows, allowing battery pack 112 to be discharged to load 108 or to be charged by charging source 108.

According to the exemplary operation represented in FIG. 3, at time t3 a fault condition in the operation of power system 102 is detected by fault detector 262. Examples of fault conditions may include excessive charge/discharge current 360, low battery voltage at battery pack 112, high temperature in current path 260 or 230 or excessively high bus voltage at high voltage bus 104/204. Moreover, in high voltage applications, fault detector 262 may be configured to detect an arc fault condition in power system 102.

As shown in FIG. 3, when a fault condition is detected by fault detector 262 at time t3, connect/disconnect control circuit 222 of connect/disconnect module 120/220 disables each of charge/discharge current path 260 and pre-charge current path 230, thereby disconnecting battery pack 112 from load and/or charging source 108. Thus, connect/disconnect control circuit 222 is configured to selectably enable and disable charge/discharge current path 260. Moreover, connect/disconnect control circuit 222 may be configured to selectably disable charge/discharge current path 260 automatically when a fault condition is detected by connect/disconnect control circuit 222. It is noted that due to the significant difference in switching speed between the transistors used to implement charge/discharge current path 260 and pre-charge current path 230, as discussed above, pre-charge current 330 is reduced more gradually than charge/discharge current 360.

As further shown by FIG. 3, in one implementation, connect/disconnect control circuit 222 is configured to persistently latch control/disconnect module 120/220 in a disconnect state even after fault detect signal 324 is cancelled. In that implementation, connect/disconnect module 120/220 remains in a disconnect state until reset signal 316/318 is received by connect/disconnect control circuit 222 at time t4. Reset signal 316/318 causes connect/disconnect module 120/220 to once again enable pre-charge current path 230, causing pre-charge current 330 to begin to flow. However, according to the exemplary operation shown in FIG. 3, a fault condition is detected at time t5 while pre-charge current path 230 is enabled, but before charge/discharge current path 260 is enabled. As a result, connect/disconnect module 120/220 is latched into a persistent disconnect state until reset signal 316/318 is received at time t6, at which time pre-charge current path 230 is once again enabled.

Figure 4:
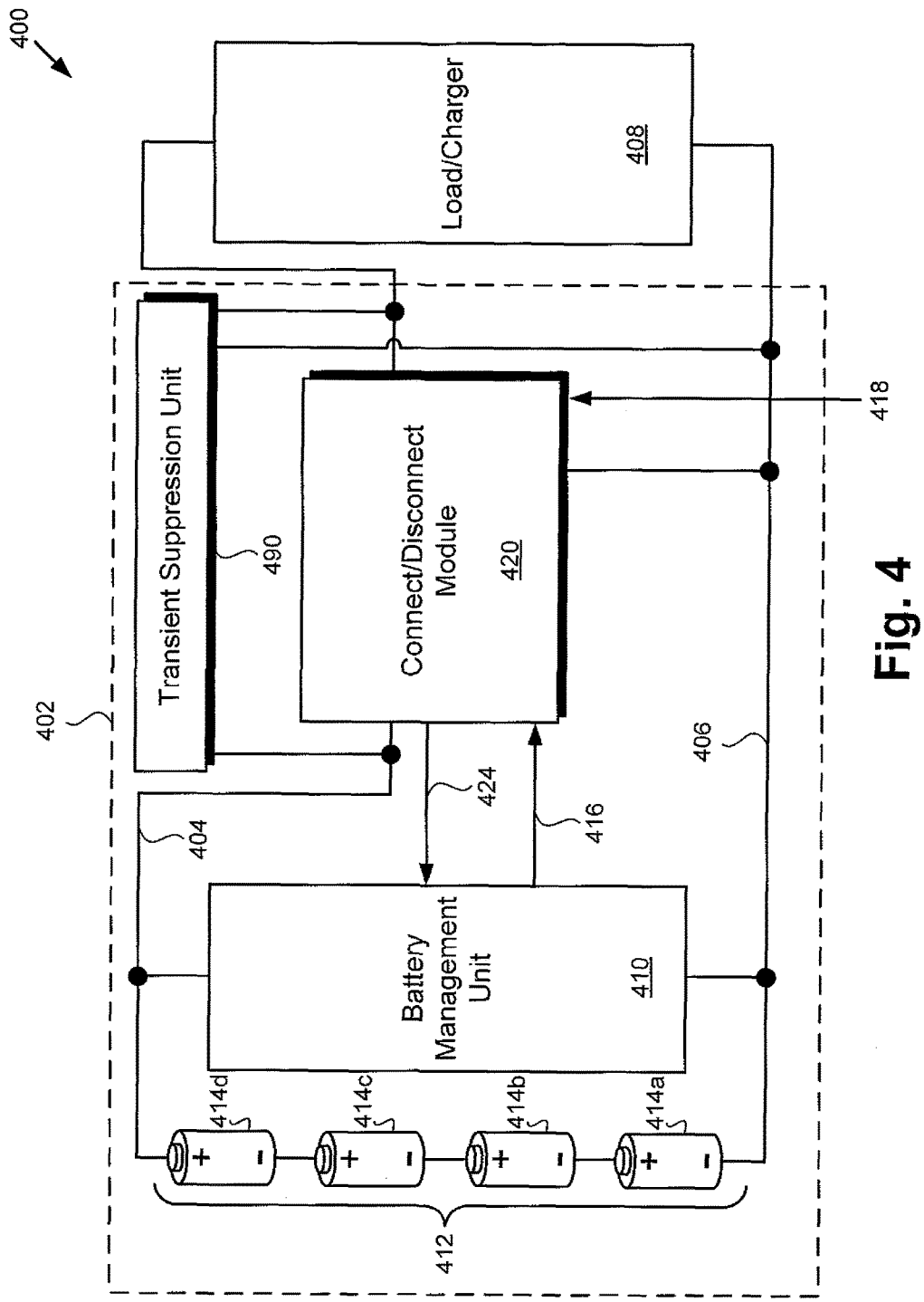
FIG. 4 shows a diagram of a power system including a battery pack and a connect/disconnect module, according to another implementation.

Referring now to FIG. 4, FIG. 4 shows a diagram of power system 402 including a battery pack and a connect/disconnect module, according to another implementation. As shown in FIG. 4, power system 402 is situated in operating environment 400 and is coupled to load and/or charging source 408. As further shown in FIG. 4, power system 402 includes battery pack 412 including multiple battery cells 414a, 414b, 414c, and 414d, battery management unit 410, connect/disconnect module 420, and transient suppression unit 490. Also shown in FIG. 1 are high voltage bus 404 and low voltage bus 406 of power system 402, communication signals 416 and 424 internal to power system 402, and control signal 418 received by connect/disconnect module 420 from a control source external to power system 402.

Battery pack 412, battery management unit 410, high voltage bus 404, and low voltage bus 406 correspond respectively in general to battery pack 112, battery management unit 110, high voltage bus 104, and low voltage bus 106, in FIG. 1, and may share any of the characteristics attributed to those corresponding features, above. In addition, load and/or charging source 408, communication signals 416 and 424, and control signal 418, correspond respectively to load and/or charging source 108, communication signals 116 and 124, and control signal 118 and may share any of the characteristics attributed to those corresponding features, above. Moreover, connect/disconnect module 420 corresponds in general to connect/disconnect module 120/220, in FIG. 1/2, and may share any of the characteristics attributed to that corresponding feature in the present application.

Power system 402 differs from power system 102 in that power system 402 is coupled to and may include transient suppression unit 490. According to the implementation shown in FIG. 4, transient suppression unit 490 is coupled to high voltage bus 404 between battery pack 412 and connect/disconnect module 420, and is further connected to both high voltage bus 404 and low voltage bus 406 between connect/disconnect module 420 and load and/or charging source 408. As shown in FIG. 4, in some implementations, transient suppression unit 490 may be integrated with power system 402. However, in other implementations, it may be advantageous or desirable for transient suppression unit 420 not to be integrated with power system 402, but to take the form of a discrete asset of operating environment 400.

Transient suppression unit 490 may be implemented as a network of resistors, capacitors, and diodes, including transorbs, and is configured to suppress voltage transients in power system 402. For example, transient suppression unit 490 may be utilized to suppress voltage transients generated due to connection or disconnection of battery pack 412 and load and/or charging source 408 by connect/disconnect module 420.

Thus, the present application discloses implementations of a connect/disconnect module suitable for use with a battery pack. By utilizing rugged transistors having a relatively large SOA to implement a pre-charge current path while utilizing much faster switching transistors having a significantly smaller SOA to implement a charge-discharge current path, the present application discloses a solution enabling fast, reliable, and safe connection and disconnection of a battery pack from its load or charging source. Moreover, the connect/disconnect module disclosed herein can advantageously be used under high current operating conditions with lithium ion or other high power density battery chemistries that are intolerant to overcharge and overdischarge events.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. A connect/disconnect module for use with a battery pack, said connect/disconnect module comprising:
   a charge/discharge current path including a first plurality of transistors having a first safe operating area (SOA);
   a pre-charge current path coupled across said charge/discharge current path, said pre-charge current path including a second plurality of transistors having a second SOA, wherein said second SOA is significantly greater than said first SOA; and
   a controller comprising
      a fault detection circuit configured to detect a fault condition within a power system, the fault detection circuit configured to turn-off first plurality of transistors and the second plurality of transistors upon detection of the fault condition, and
      a fault latch configured to keep the first plurality of transistors and the second plurality of transistors off from a time that the fault condition is detected until a reset signal is received.

2. The connect/disconnect module of claim 1, wherein said first plurality of transistors has a switching speed at least one thousand times greater than a switching speed of said second plurality of transistors.

3. The connect/disconnect module of claim 1, wherein said first plurality of transistors comprise group IV trench field-effect transistors (FETs).

4. The connect/disconnect module of claim 1, wherein said first plurality of transistors comprise group IV trench superjunction FETs.

5. The connect/disconnect module of claim 1, wherein said first plurality of transistors comprise group III-V high electron mobility transistors (HEMTs).

6. The connect/disconnect module of claim 1, wherein said second plurality of transistors comprise group IV planar FETs.

7. The connect/disconnect module of claim 1, wherein said second plurality of transistors comprise group IV insulated-gate bipolar transistors (IGBTs).

8. The connect/disconnect module of claim 1, further comprising a control circuit configured to selectably enable and disable said charge/discharge current path.

9. The connect/disconnect module of claim 1, further comprising a control circuit configured to disable said charge/discharge current path automatically when a fault is detected by said control circuit.

10. A power system comprising:
a battery pack;
a battery management unit for controlling battery charging and discharging coupled to said battery pack; and
a connect/disconnect module coupled between said battery pack and at least one of a charging source and a load of said battery pack, said connect/disconnect module comprising
a charge/discharge current path including a first plurality of transistors having a first safe operating area (SOA), and a pre-charge current path coupled across said charge/discharge current path, said pre-charge current path including a second plurality of transistors having a second SOA, wherein said second SOA is significantly greater than said first SOA, and
a controller comprising
a fault detection circuit configured to detect a fault condition within the power system, the fault detection circuit configured to turn-off first plurality of transistors and the second plurality of transistors upon detection of the fault condition, and
a fault latch configured to keep the first plurality of transistors and the second plurality of transistors off from a time that the fault condition is detected until a reset signal is received.

11. The power system of claim 10, wherein said first plurality of transistors of said connect/disconnect module has a switching speed at least one thousand times greater than a switching speed of said second plurality of transistors of said connect/disconnect module.

12. The power system of claim 10, wherein said first plurality of transistors of said connect/disconnect module comprise group IV trench field-effect transistors (FETs).

13. The power system of claim 10, wherein said first plurality of transistors of said connect/disconnect module comprise group IV superjunction FETs.

14. The power system of claim 10, wherein said first plurality of transistors of said connect/disconnect module comprise group III-V high electron mobility transistors (HEMTs).

15. The power system of claim 10, wherein said second plurality of transistors of said connect/disconnect module comprise group IV planar FETs.

16. The power system of claim 10, wherein said second plurality of transistors of said connect/disconnect module comprise group IV insulated-gate bipolar transistors (IGBTs).

17. The power system of claim 10, wherein said connect/disconnect module further comprises a control circuit configured to selectably enable and disable said charge/discharge current path.

18. The power system of claim 10, wherein said connect/disconnect module further comprises a control circuit configured to disable said charge/discharge current path automatically when a fault is detected by said control circuit.

19. The power system of claim 10, wherein said connect/disconnect module is integrated with said battery pack.

20. The power system of claim 10, further comprising a transient suppression unit coupled to said battery pack and said connect/disconnect module, said transient suppression unit configured to suppress voltage transients in said power system.

21. The power system of claim 10, wherein the controller is configured to:
receive an enable signal;
activate the pre-charge current path upon receipt to the enable signal by increasing a voltage on control nodes of the second plurality of transistors at a first rate; and
activate the charge/discharge current path after activating the pre-charge current path by increasing a voltage on control nodes of the first plurality of transistors at a second rate faster than the first rate.

22. The power system of claim 10, wherein:
the first plurality of transistors comprises;
a first transistor having a body diode oriented in a first direction and a first control node coupled to a first control terminal;
a second transistor coupled in series with the first transistors, the second transistor having a body diode oriented in a second direction opposite the first direction and a second control node coupled to the first control terminal; and
a third transistor coupled in series with the first transistor and the second transistor, the second transistor having a body diode oriented in the second direction and a third control node coupled to a second control terminal.

23. The power system of claim 10, wherein:
said first plurality of transistors comprise trench field-effect transistors (FETs); and
said second plurality of transistors comprise planar FETs.

24. The connect/disconnect module of claim 1, wherein the controller is further configured to:
receive an enable signal;
activate the pre-charge current path upon receipt to the enable signal by increasing a voltage on control nodes of the second plurality of transistors at a first rate; and
activate the charge/discharge current path after activating the pre-charge current path by increasing a voltage on control nodes of the first plurality of transistors at a second rate faster than the first rate.

25. A connect/disconnect module for use with a battery pack, said connect/disconnect module comprising:
a charge/discharge current path including a first plurality of transistors having a first safe operating area (SOA); and
a pre-charge current path coupled across said charge/discharge current path, said pre-charge current path including a second plurality of transistors having a second SOA, wherein said second SOA is significantly greater than said first SOA, wherein the first plurality of transistors comprises
a first transistor having a body diode oriented in a first direction and a first control node coupled to a first control terminal,
a second transistor coupled in series with the first transistors, the second transistor having a body diode oriented in a second direction opposite the first direction and a second control node coupled to the first control terminal, and
a third transistor coupled in series with the first transistor and the second transistor, the second transistor having a body diode oriented in the second direction and a third control node coupled to a second control terminal.

26. The connect/disconnect module of claim 1, wherein:

the first SOA comprises a first set of voltage and current conditions over which the first plurality of transistors can operate without being damaged; and the second SOA comprises a second set of voltage and current conditions over which the second plurality of transistors can operate without being damaged.

27. The connect/disconnect module of claim 1, wherein:

said first plurality of transistors comprise trench field-effect transistors (FETs); and said second plurality of transistors comprise planar FETs.

* * * * *

UNITED STATES PATENT AND TRADEMARK OFFICE
CERTIFICATE OF CORRECTION

PATENT NO. : 10,199,843 B2
APPLICATION NO. : 15/015038
DATED : February 5, 2019
INVENTOR(S) : Paul L. Schimel Page 1 of 1

It is certified that error appears in the above-identified patent and that said Letters Patent is hereby corrected as shown below:

In the Claims

In Column 8, Line 60, Claim 4, delete "trench".

Signed and Sealed this
Nineteenth Day of March, 2019

Andrei Iancu
*Director of the United States Patent and Trademark Office*